A. BLONDEL.
PHOTOMETER.
APPLICATION FILED NOV. 4, 1913.

1,208,279.

Patented Dec. 12, 1916.
3 SHEETS—SHEET 1.

WITNESSES

INVENTOR
ANDRÉ BLONDEL
BY
ATTORNEY

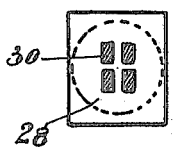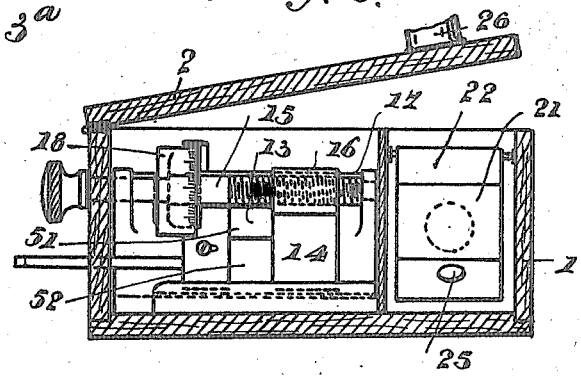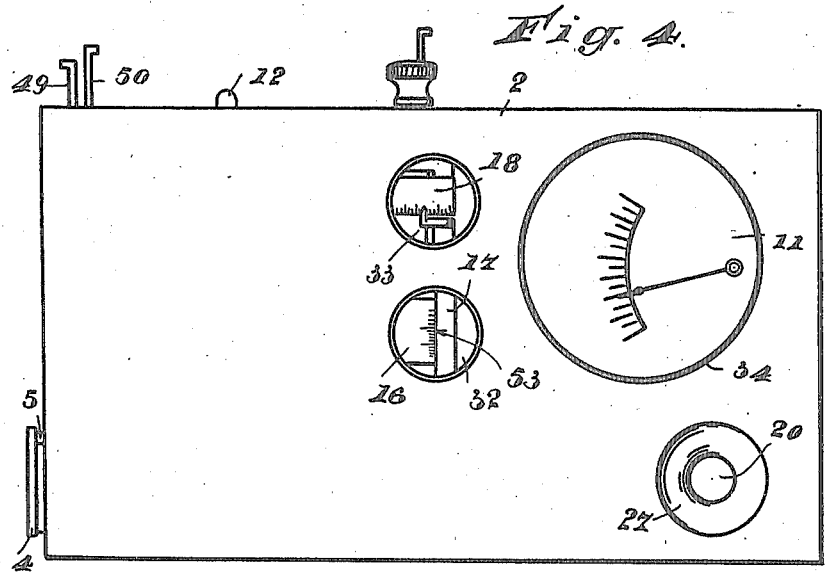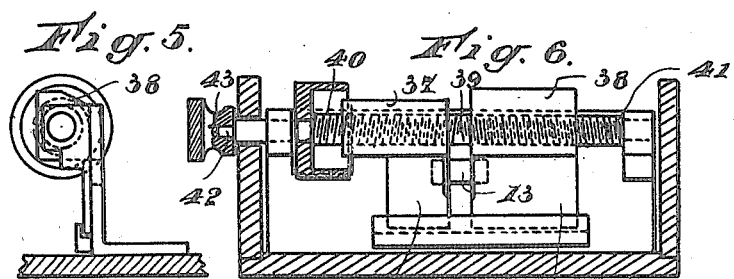

A. BLONDEL.
PHOTOMETER.
APPLICATION FILED NOV. 4, 1913.

1,208,279.

Patented Dec. 12, 1916.
3 SHEETS—SHEET 3.

WITNESSES

INVENTOR
ANDRÉ BLONDEL
ATTORNEY

UNITED STATES PATENT OFFICE.

ANDRÉ BLONDEL, OF PARIS, FRANCE.

PHOTOMETER.

1,208,279.            Specification of Letters Patent.    Patented Dec. 12, 1916.

Application filed November 4, 1913.  Serial No. 799,152.

*To all whom it may concern:*

Be it known that I, ANDRÉ BLONDEL, a citizen of the French Republic, residing at Paris, France, have invented a new and useful Photometer; and I do hereby declare the following to be a full, clear, and exact description of the same.

This invention has for its object a portable photometer capable of measuring without difficulty by means of a luminous comparing surface, the apparent brightness of surfaces which are illuminated by any luminous source, and of determining if necessary the intensity of said source. For this purpose various apparatus have been constructed which make use for varying the intensity of the comparing illumination, either of the displacement of the auxiliary source or the displacement of a screen illuminated by the latter.

According to the present invention the operator views the surface to be photometered through the transparent portion of a half-reflecting and half-transparent surface. The reflecting portion receives the light either from a comparing source or from a comparing screen illuminated by said source.

It varies the illumination of the reflecting portion either by means of an apparatus having a slit of variable widths which varies the dimension that is employed of the source of light, either by displacing the comparing screen by means of a translating mechanism, or by varying the relative direction of two Nicol prisms placed between the source and the screen or by any other known method. The whole is contained in a box which contains also a measuring instrument to allow of controlling the intensity or the voltage of the current serving to illuminate the comparing luminous source.

The present invention is illustrated by way of example in the accompanying drawings, in which:—

Figure 1:
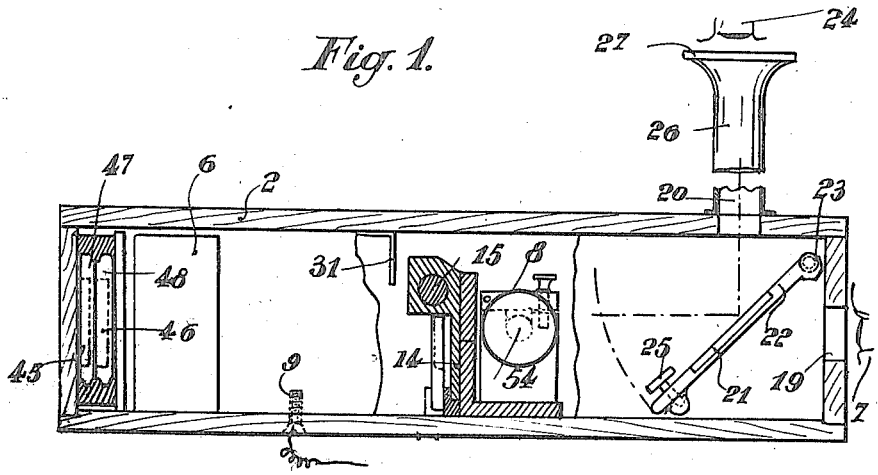
Figure 2:
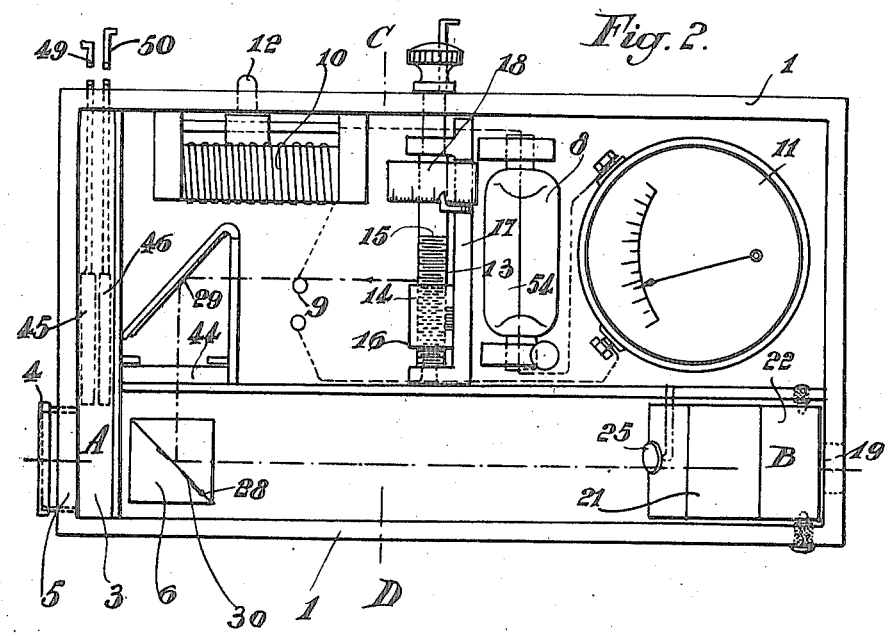
Figure 7:
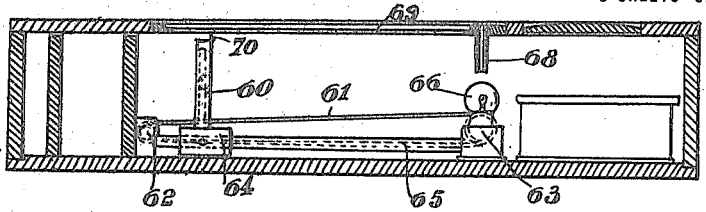
Figure 8:
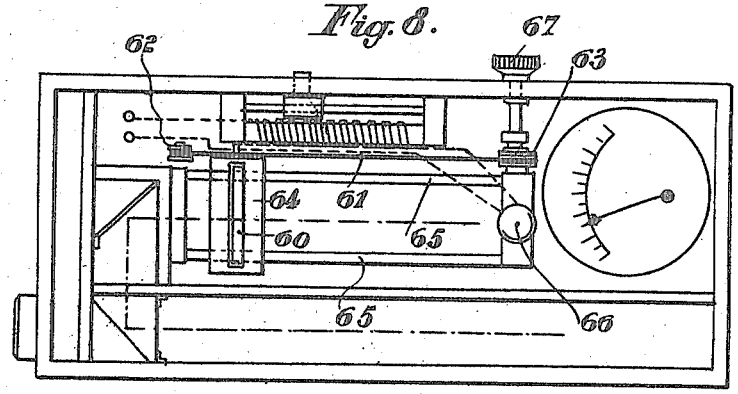
Figure 9:
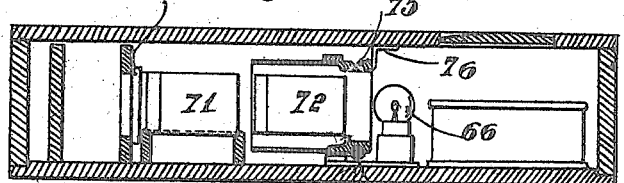
Figure 10:
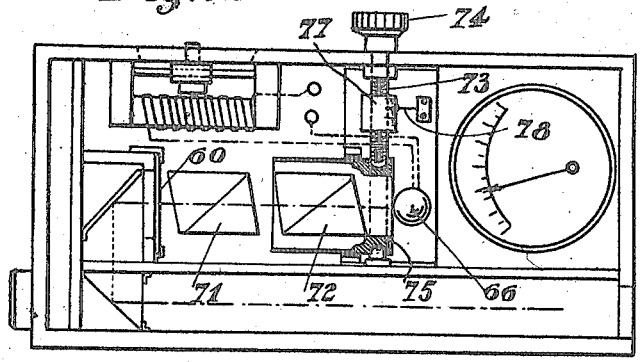

Figure 1 is a longitudinal section of the apparatus on the line A,—B of Fig. 2. Fig. 2 is a plan of the apparatus with the cover removed. Fig. 3 is a cross section of the apparatus on the line C—D of Fig. 2. Fig. 3ª shows what is seen by an observer looking through the eye hole for making the measurement. Fig. 4 is a plan of the apparatus when closed. Figs. 5 and 6 illustrate a double "catseye" device employed in the modification of the apparatus. Figs. 7 and 8 are respectively a vertical section and a plan of a modification. Fig. 9 and 10 are similar figures of another modification.

The portable photometer shown in Figs. 1, 2, 3, and 4, consists of a box 1 adapted to be closed by means of a cover 2. Inside the box 1 is an arrangement of apparatus allowing of comparing the luminous source to be measured with a source of uniform brightness whose surface is varied in known ratios. The light of the source to be photometered enters the apparatus through the aperture 3 (Fig. 2). This aperture may or may not be provided with an opal glass 4 carried by the mount 5, which is screwed in the aperture 3 according as it is desired to measure the intensity of a luminous source or that of a brightness or illumination.

The half-reflecting and half-transparent surface is constituted by the separating surface if two rectangular triangular prisms 6, juxtaposed on the Lummer-Brodhun system, one of which bears upon the common surface silvered parts 30 (Fig 3ª), while the remainder 28 of the surface is transparent. The comparing source consists in the example shown of a glow lamp 8. The current supplied by a small portable storage battery enters at the terminals 9, passes through the rheostat 10, the lamp 8 and the amperemeter 11.

The intensity of the current in the lamp is regulated by operating the movable contact 12 of the rheostat 10. The lamp 8 is a straight-filament lamp. The filament 54 is arranged horizontally at right angles to the direction of the luminous rays projected into the apparatus by the source to be measured.

The variations of the illumination furnished by the comparing source are produced by means of the diaphragm constituted by an aperture 13 of regulable width situated in front of the filament 54. The width of the aperture 13 is determined by the position of a movable shutter 14 operated by means of a screw 15 through the medium of a sliding sleeve 16 bearing graduated divisions drawn on a line parallel to the axis of the screw 15. This shutter slides in front of a wide horizontal slit 51 formed in a fixed plate 52 parallel to the axis of the screw 15. A fixed rule 17 situated transversely to the box and parallel to the axis of the screw 15 bears one or more fixed register marks 53 which allow of controlling the displacement of the sleeve 16 and the shutter 14.

In order to increase the accuracy of the reading off, there is fixed on the spindle of the screw 15 a cylinder 18 bearing on its circumference a series of divisions. The pitch of the screw 15 is made such that it shall be equal to the spacing of the divisions marked on the sleeve 16. The divisions on the cylinder 18 enable the fractions of a turn of the screw to be determined. The diaphragm constituted by the aperture 13 and the shutter 14 may for example be so formed as to allow of a displacement of the shutter equal to five times the pitch of the screw, and the micrometric cylinder may have a hundred divisions, so that readings up to 1/500 can be made without difficulty.

The observer who takes the measurements takes a sight generally through the eye-hole 19 formed in the side of the box 1 opposite the aperture 3. In some cases the observer may also look through an eye-hole 20 formed in the cover 2 (see Fig. 1). In such a case the luminous rays issuing from the aperture 3, and from the comparing luminous source are reflected by a mirror 21 mounted on a shutter 22 that is movable on the axle 23. A knob 25, allows of fixing the shutter 22 either in its horizontal position or at an angle of 45 degrees. For the purpose of bringing the eye to the minimum distance for distinct vision of the surfaces to be examined, a telescopic tube 26, provided if desired with an eye piece 27, may be screwed on to the eye holes 19 or 20.

The path of the light rays through the apparatus is as follows:—The rays coming from the outside, pass first through the aperture 3, then through the unsilvered portion 28 of the prism 6, continue on leaving the said prism in a path parallel to the long side of the box, and then strike the eye of the observer, either directly when his eye is in the position 7, or indirectly and by reflection on the mirror 21 when the eye is in the position 24. The rays emitted by the comparing source (see arrows in Fig. 2), the slit 13, strike a silvered mirror 29 which is located, when the box is horizontal, in a vertical plane arranged at 45 degrees to the side of the box, are reflected by this mirror, strike the silvered portions 30 of the prism 6 by which they are reflected, and thence follow a path parallel to that of the rays coming from the outside. An angle piece 31 fixed under the cover 2, prevents the rays of the source of comparison from passing to the other side of the diaphragm 13, otherwise than through the adjustable slit.

The cover 2 of the apparatus has three lenses (Fig. 4). The lenses 32 and 33 serve for reading the divisions on the sleeve 16 and the cylinder 18. The lens 34 serves for reading the divisions of the amperemeter 11 for the purpose of verifying the constancy of the current feeding the comparing lamp.

The divisions of the sleeve 17 of the cylinder 18 and of the amperemeter 11 are illuminated by the light of the lamp 8. The device of the silvered part 30 shown in Fig. 3 may also be replaced with advantage by a silvered portion in the form of a vertical strip of 1 to 4 mm. in width.

The diaphragm may, as shown in Figs. 5 and 6, have a form different from that shown in Fig. 2. In this second modification, the diaphragm is of the type known as "cats-eye," and consists of two movable shutters 35 and 36 fixed to two screw threaded sleeves 37 and 38 which can be moved in opposite directions by means of a screw 39 which has two screw threads of opposite hands 40 and 41, and is actuated from the outside by means of a square part 42 and a movable milled knob 43.

The operation of the apparatus is effected as follows: The observer looking for instance through the eye hole 19, sees directly through the unsilvered portions 28 of the prism 6 the luminous surface of which he desires to measure the illumination. When the current is not passing through the lamp, the observer will see, as shown in Fig. 3ª, a series of dark spots corresponding to the silvered portions 30 of the prism contrasting with the clear background formed by the transparent portions.

On allowing the current to pass through the lamp the rays emitted by the latter will pass through the slit 13, will be reflected on the mirror 29, and will strike the silvered portions of the prism which they illuminate. These silvered portions instead of appearing as dark spots, will appear to be illuminated, and their illumination may be greater or less than that of the back ground formed by the transparent portions 28, according to the intensity of the comparing source. By operating the screw 15 of the diaphragm 13 the illumination of the silvered portions may be made equal to that of the unsilvered portions in such a manner that the eye shall perceive only a single uniformly illuminated spot.

To enable measurements to be made in the case where the source whose illuminations is to be measured, is not very luminous, a series of absorbing glasses are provided which are placed in the path of the rays emitted by the source of comparison, for instance at 44 between the mirror 29 and the prism. Similarly absorbing glasses may be placed at 45 and 46 in the path of the light rays emitted by the source, the intensity of whose luminosity it is desired to measure. These glasses may be fixed in mounts 47 and 48 and be moved into position by means of rods 49 and 50. In this manner a uniformly illuminated surface is presented to the eye in all cases. The reading of the micrometric divisions indicating the width of the aperture 13 or of the "cats-eye", then allows of determining without difficulty the luminous intensity of the source which is being investigated.

When it is desired to employ the apparatus for measuring the apparent brightness of an illuminated surface, the observer looks directly at the said surface through the sighting telescope in such a manner as to see the prism 6 projected upon the surface which is being investigated. The apparatus is calibrated or standardized by measuring the aperture in the diaphragm or the "cats-eye" directing upon the silvered portions 30 a brightness apparently equal to that directed upon the background 28 by a sheet of white paper placed at a known distance from a light of known intensity. It is of advantage to regulate the intensity of the current in the lamp so that the constant of the apparatus thus obtained for the aperture in the diaphragm shall be a round number. For instance, so that a sheet of white paper receiving an illumination of 50 lux shall be made equal as regards illumination upon the surfaces 28 and 30 of the prisms 6 through the aperture of a "cats-eye" equal to 500 divisions.

For measuring the intensities of sources of light, the opal glass 4 is placed upon the mount 5, and this opal glass is directed at right angles to the direction of the rays emitted by the source of light which is being investigated, after having moved the apparatus to a known distance from this source.

The aperture of the diaphragm is varied so as to produce equal illuminations upon the surfaces 28 and 30. Then this source of light is replaced by a source of known intensity placed at the same distance and the ratio between the apertures of the "cats-eye" in the two cases will be a measure of the ratio between the luminous intensities. Further the constants of the apparatus may be established by measuring the number of divisions which correspond for instance to a source of light of 10 candles placed at one meter distance from the opal glass. For the purpose of measuring illuminations in streets, the observer views through the prism a surface of comparison which is always the same, for instance a screen of dull-enameled sheet metal or a sheet of dull Bristol board placed at the very spot it is desired to measure the illumination; this sheet being arranged horizontally or vertically according to the purpose in view.

The apparatus forming the subject of the invention is differentiated from the known apparatus in that the distance of the source of comparison from the screen on which the two illuminations are compared is fixed, and that the amount of the light employed is varied at will, while the apparatus comprises in addition measuring instruments which allow of maintaining the constant intensity of the source of comparison. Further the illumination of the source to be investigated may be reduced by a known ratio with the help of opal glasses. The apparatus is therefore complete in itself, and although it is portable and of small bulk, it can serve for measuring with very great accuracy the brightness, illuminations, or luminous intensities of any surface or source, that may be desired. The measuring operation is further extremely rapid, so that the apparatus may be used for instance by photographers for determining the duration of exposure which is of great advantage for color photography.

Figs. 7 and 8 show in vertical and horizontal sections a modification of the foregoing apparatus in which the variation of the illumination of the source of comparison instead of being produced by varying the opening of a slit, is produced by the displacement of the comparing screen. In these figures the comparing screen 60 may be displaced by any suitable means for instance, by means of an endless wire 61 passing over two pulleys 62, 63 for drawing the carriage 64 that carries the screen. This carriage is guided by two slide rods 65. By this means the distance of the screen 60 may be varied for instance from 1 to 10, relatively to the inner lamp 66 which serves as a fixed source of comparison. This operation is effected by means of a knob 67. A sighting device 68 may be provided for enabling the observer to ascertain that the filament of the glow lamp is always in the same point of space. The distances are measured on the transparent scale 69 by means of a pointer 70 carried by the screen carriage. The scale may be graduated if desired, directly in degrees of luminous intensity according to known methods. In other respects the construction of the photometer is identical with that of the foregoing Figs. 1 and 2.

Figs. 9 and 10 show similarly in vertical and horizontal sections, another modification in which the intensity of illumination produced by the lamp 66 which is fixed, upon a comparing screen 60 which is likewise fixed, is modified at will by using two Nicol prisms 71 and 72. One of these prisms, 72, for instance, is fixed in a tube that is capable of turning on its axis, and whose rotation is effected by a worm 73 actuated by means of a milled knob 74. The rotation of the prism 72 may be measured in any suitable manner. For instance the face 75 of the rotary tube may be graduated and a pointer 76 arranged in front of this graduation. Or, the worm may be provided with a nut 77 having a graduated surface adapted to move in front of a pointer 78. In other respects the construction of the apparatus is the same as that of the main Figs. 1 and 2.

It is to be understood that this invention is not limited to the details described and shown. For instance, in its applications where a smaller degree of accuracy is required, the prism 6 may be replaced by a glass plate arranged at 45 degrees. The source may be as in the case shown, a glow lamp having a straight filament made of transparent or matted glass (dull surface) or it may be an opal globe in the center of which is a small glow lamp.

The amperemeter serving to calibrate, may also be replaced by a voltmeter measuring the potential at the terminals of the said lamp. The box may be provided with two threaded sockets for enabling the apparatus to be fixed upon a stand (for instance, the stand of a photographic apparatus). The said box may also be provided with a hook or with a slideway for fixing the storage battery thereto.

Having fully described my invention, what I claim and desire to secure by Letters Patent is:

1. In a photometer, the combination of an incandescent lamp having a straight luminous body; and a part provided with an adjustable slit in close proximity to said body; and means for adjusting the width of the slit.

2. In a photometer, the combination of an incandescent lamp serving as a source of light with which the light to be examined is compared and comprising a straight luminous body of small diameter; and a pair of shutters in close proximity to the lamp; and means for adjusting the width of the slit formed between the shutters.

3. In a photometer, the combination of an electric incandescent lamp comprising a cylindrical bulb of small diameter and a straight light giving body of small diameter and located axially thereof; a pair of relatively movable shutters located in close proximity to said bulb; and a micrometer screw adapted to engage one of the shutters for changing at will the width of the slit between said shutters in the direction of the length of said light giving body.

4. In a photometer, the combination of an electric incandescent lamp having a straight light giving body of small diameter; a pair of relatively movable shutters located in close proximity to said body; a micrometer screw adapted to change at will the width of the slit between said shutters in the direction of the length of said light giving body; and a screen on which the light from said body falls with a luminosity which is variable proportionally to the width of the slit.

5. In a photometer, the combination of a source of light having a straight luminous body of small diameter; a slit-diaphragm near said light; means for adjusting said slit; a screen on which the light from said source falls through said slit-diaphragm; and an optical comparison device having a reflecting portion adapted to receive rays reflected from said screen, and a transparent portion adapted to transmit the rays from the surface of which the luminosity is to be measured parallel and near to the rays reflected from the reflecting portion.

6. In a photometer, the combination of an incandescent lamp serving as a source of light for comparison with the light to be examined, and comprising a straight luminous filament of small diameter; and means forming an adjustable slit in close proximity to said filament; means for accurately adjusting and measuring the width of the slit; and a galvanometer and a rheostat connected in series with said lamp for varying and verifying the current traversing said body.

In testimony whereof, I have signed my name to this specification in the presence of two subscribing witnesses.

ANDRÉ BLONDEL.

Witnesses:
 HENRI BOENZA,
 HANSON C. COXE.